(12) United States Patent
Inaba et al.

(10) Patent No.: US 10,507,558 B2
(45) Date of Patent: Dec. 17, 2019

(54) MACHINE TOOL SYSTEM

(71) Applicant: FANUC CORPORATION, Yamanashi (JP)

(72) Inventors: Yoshiharu Inaba, Yamanashi-ken (JP); Hiroyuki Uchida, Yamanashi-ken (JP); Zheng Tong, Yamanashi-ken (JP); Yasuhiko Kurosumi, Yamanashi-ken (JP); Masanori Itou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/907,792

(22) Filed: Feb. 28, 2018

(65) Prior Publication Data

US 2018/0250783 A1 Sep. 6, 2018

(30) Foreign Application Priority Data

Mar. 2, 2017 (JP) .................................. 2017-038928

(51) Int. Cl.
*B23Q 15/22* (2006.01)
*B23Q 3/155* (2006.01)
(Continued)

(52) U.S. Cl.
CPC ......... *B23Q 15/22* (2013.01); *B23Q 3/15526* (2013.01); *B23Q 3/15534* (2016.11);
(Continued)

(58) Field of Classification Search
None
See application file for complete search history.

(56) References Cited

U.S. PATENT DOCUMENTS 5,242,360 A * 9/1993 Bayer .................. B23Q 1/0027
408/238
5,751,584 A 5/1998 Yuasa et al.
(Continued)

FOREIGN PATENT DOCUMENTS

CN 101559568 A 10/2009
CN 102211294 A 10/2011
(Continued)

OTHER PUBLICATIONS

English Abstract and Machine Translation for Japanese Publication No. 2009-265023 A, published Nov. 12, 2009, 14 pgs.
(Continued)

*Primary Examiner* — Thomas C Lee
*Assistant Examiner* — Gary Collins
(74) *Attorney, Agent, or Firm* — Fredrikson & Byron, P.A.

(57) ABSTRACT

A machine tool system includes a machine tool main body for machining a workpiece supported on a table by using a tool detachably attached to a spindle, and an information processing apparatus. The machine tool main body includes a rotary tool magazine in which multiple grips each capable of holding the tool to be attached to the spindle are provided along the circumferential direction, and an image pickup device that is arranged in the tool magazine and configured to take an image of multiple members in a machining area of the machine tool main body. The information processing apparatus includes a geometric feature calculating unit configured to calculate the shapes and the arrangement state of the multiple members in the machining area, based on image data of the image taken by the image pickup device.

16 Claims, 6 Drawing Sheets

(51) Int. Cl.
 B23Q 17/24 (2006.01)
 G05B 19/31 (2006.01)
 B23Q 11/08 (2006.01)

(52) U.S. Cl.
 CPC ....... B23Q 17/2404 (2013.01); B23Q 17/249 (2013.01); B23Q 17/2409 (2013.01); B23Q 17/2452 (2013.01); G05B 19/31 (2013.01); B23Q 11/0891 (2013.01); B23Q 2220/006 (2013.01); B23Q 2716/00 (2013.01); G05B 2219/35519 (2013.01)

(56) References Cited

U.S. PATENT DOCUMENTS

| | | | | |
|---|---|---|---|---|
| 6,161,055 | A * | 12/2000 | Pryor | G05B 19/4065 382/152 |
| 6,535,788 | B1 * | 3/2003 | Yoshida | G05B 19/40931 700/191 |
| 2001/0041651 | A1 * | 11/2001 | Abe | B23Q 1/0009 483/3 |
| 2002/0002885 | A1 * | 1/2002 | Luik | B23B 31/00 82/118 |
| 2004/0107018 | A1 | 6/2004 | Nakamura | |
| 2004/0111855 | A1 * | 6/2004 | Pfau | B23P 11/027 29/407.04 |
| 2006/0259180 | A1 * | 11/2006 | Jahn | G06T 7/75 700/175 |
| 2008/0053976 | A1 * | 3/2008 | Yamazaki | B23K 26/0884 219/121.78 |
| 2009/0062955 | A1 * | 3/2009 | Ide | G05B 19/4061 700/178 |
| 2009/0312858 | A1 * | 12/2009 | Alpay | B23K 26/38 700/103 |
| 2011/0039670 | A1 * | 2/2011 | Honegger | B23Q 1/012 483/56 |
| 2015/0068272 | A1 * | 3/2015 | Kasahara | G05B 19/4061 73/1.79 |
| 2016/0016274 | A1 | 1/2016 | Grau | |
| 2016/0221259 | A1 * | 8/2016 | Kobida | B29C 64/106 |
| 2016/0263745 | A1 * | 9/2016 | Shirahata | B25J 9/1697 |
| 2017/0045877 | A1 * | 2/2017 | Shapiro | B23K 37/0235 |

FOREIGN PATENT DOCUMENTS

| | | |
|---|---|---|
| CN | 102275094 A | 12/2011 |
| CN | 104511744 A | 4/2015 |
| CN | 105081883 A | 11/2015 |
| CN | 205703287 U | 11/2016 |
| JP | 236053 A | 2/1990 |
| JP | 5322527 A | 12/1993 |
| JP | 852638 A | 2/1996 |
| JP | 2002254275 A | 9/2002 |
| JP | 2004185123 A | 7/2004 |
| JP | 2005324262 A | 11/2005 |
| JP | 2006102923 A | 4/2006 |
| JP | 2006255826 A | 9/2006 |
| JP | 2009140251 A | 6/2009 |
| JP | 2009188265 A | 8/2009 |
| JP | 2009265023 A | 11/2009 |
| JP | 2010107351 A | 5/2010 |
| WO | 2015111200 A1 | 7/2015 |

OTHER PUBLICATIONS

English Abstract and Machine Translation for Japanese Publication No. 2009-188265 A. published Aug. 20, 2009, 13 pgs.
English Abstract and Machine Translation for Japanese Publication No. 2009-140251 A, published Jun. 25, 2009, 16 pgs.
English Abstract for Japanese Publication No. 2004185123 A, published Jul. 2, 2004, 2 pgs.
English Abstract for Japanese Publication No. JPH0852638 A, published Feb. 27, 1996, 2 pgs.
English Abstract and Machine Translation for Japanese Publication No. 05-322527 A, published Dec. 7, 1993, 6 pgs.
English Abstract and Machine Translation for Japanese Publication No. 2006-102923 A, published Apr. 20, 2006, 8 pgs.
English Abstract and Machine Translation for Japanese Publication No. 2005-324262 A, published Nov. 24, 2005, 13 pgs.
English Abstract and Machine Translation for Japanese Publication No. 2002-254275 A, published Sep. 10, 2002, 8 pgs.
English Abstract and Machine Translation for Japanese Publication No. 2010-107351 A, published May 13, 2010, 11 pgs.
English Abstract and Machine Translation for Japanese Publication No. 2006-255826 A, published Sep. 28, 2006, 10 pgs.
English Abstract and Machine Translation for International Publication No. WO 2015/111200 A1, published Jul. 30, 2015, 29 pgs.
English Abstract and Machine Translation for Chinese Publication No. 101559568 A, published Oct. 21, 2009, 11 pgs.
English Abstract and Machine Translation for Chinese Publication No. 102211294 A, published Oct. 12, 2011, 30 pgs.
English Abstract and Machine Translation for Chinese Publication No. 102275094 A, published Dec. 14, 2011, 44 pgs.
English Abstract and Machine Translation for Chinese Publication No. 104511744 A, published Apr. 15, 2015, 6 pgs.
English Abstract for Chinese Publication No. 105081883 A, published Nov. 25, 2015, 1 pg.
English Abstract and Machine Translation for Chinese Publication No. 205703287 U, published Nov. 23, 2016, 8 pgs.
English Abstract and Machine Translation for Japanese Publication No. 02-036053 A, published Feb. 6, 1990, 6 pgs.

* cited by examiner

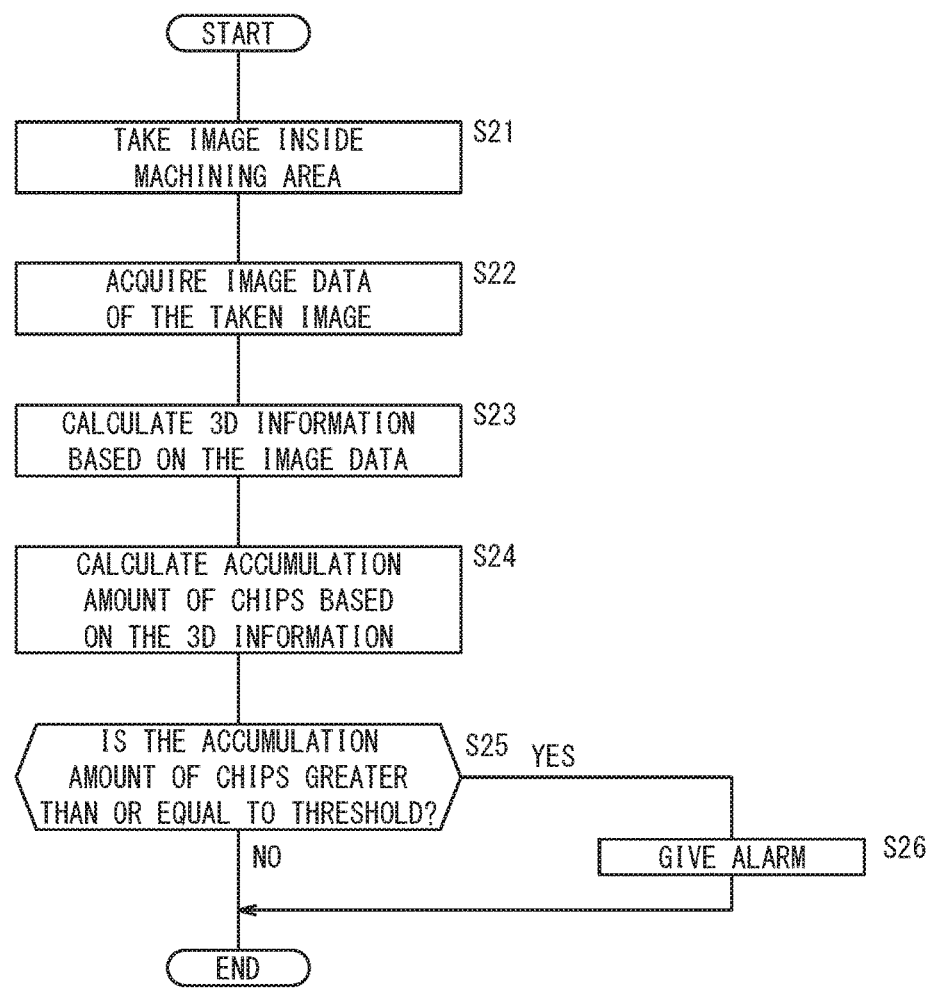

MACHINE TOOL SYSTEM

CROSS-REFERENCE TO RELATED APPLICATION

This application is based upon and claims the benefit of priority from Japanese Patent Application No. 2017-038928 filed on Mar. 2, 2017, the contents of which are incorporated herein by reference.

BACKGROUND OF THE INVENTION

Field of the Invention

The present invention relates to a machine tool system including an image pickup device for imaging a machining area in a machine tool main body.

Description of the Related Art

Japanese Laid-Open Patent Publication No. 2009-265023 discloses a configuration of acquiring 3-dimensional data of the shape of a workpiece in order to determine collision between the workpiece and a part of a machine tool.

SUMMARY OF THE INVENTION

However, since, in the configuration of Japanese Laid-Open Patent Publication No. 2009-265023, the image pickup device is attached to the spindle of the machine tool to take images in the machining area, the degree of freedom for imaging is limited. As a result, cases occur where 3-dimensional shapes of some members cannot be measured in the machining area. This makes it impossible to perform accurate check as to whether interference occurs between a tool and multiple members residing in the machining area of the machine tool. Also, since there is a demand to grasp the state of the machining area right before machining, imaging is often performed immediately before machining. In this case, it is necessary to detach the image pickup device from the spindle after completion of image-capturing and then attach the tool to the spindle and start machining, so that it takes long time to prepare before machining.

It is therefore an object of the present invention to provide a machine tool system that can improve the flexibility in imaging by an image pickup device and shorten the preparation time before the start of machining.

According to an aspect of the present invention, there is provided a machine tool system including: a machine tool main body for machining a workpiece supported on a table by using a tool detachably attached to a spindle; and an information processing apparatus. The machine tool main body includes a rotary tool magazine in which a plurality of grips each capable of holding the tool to be attached to the spindle are provided along the circumferential direction, and an image pickup device arranged in the tool magazine and configured to take an image of multiple members including at least the workpiece in a machining area of the machine tool main body. The information processing apparatus includes a geometric feature calculating unit configured to calculate the shapes of the multiple members in the machining area and the arrangement state thereof, based on image data of the image taken by the image pickup device.

According to the present invention, it is possible to improve the flexibility of image-taking by an image pickup device and shorten the preparation time for machining.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a flowchart showing a second control operation of the machine tool system shown in FIG. 1.

DESCRIPTION OF THE PREFERRED EMBODIMENTS

Now, a machine tool system according to the present invention will be detailed hereinbelow by describing a preferred embodiment with reference to the accompanying drawings.

Figure 1:
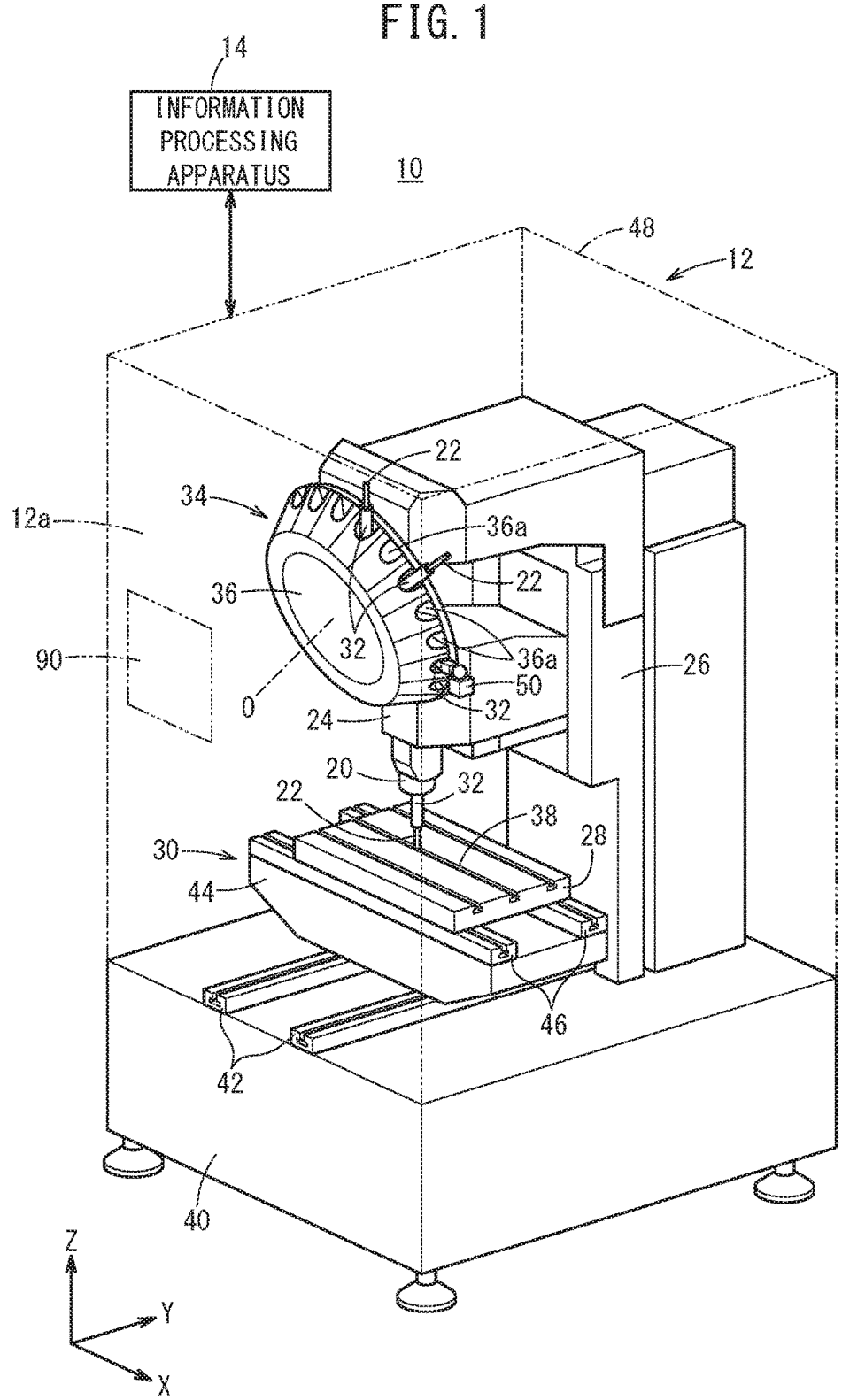
FIG. 1 is an external view of the configuration of a machine tool system.

FIG. 1 is an external configuration diagram of a machine tool system 10. The machine tool system 10 includes a machine tool main body 12 and an information processing apparatus 14. This information processing apparatus 14 may be a controller (e.g., a numerical control device) that controls the machine tool main body 12, or may be a controller other than the controller that controls the machine tool main body 12. In the case where the information processing apparatus 14 is a controller other than the controller that controls the machine tool main body 12, the information processing apparatus 14 and the controller for the machine tool main body 12 are connected to each other via wired or wireless communications. In the present embodiment, it is assumed that the information processing apparatus 14 also functions as the controller for controlling the machine tool.

The machine tool main body 12 machines an unillustrated target object to be machined (which will be referred to, hereinbelow, as a workpiece) by a tool (cutting tool) 22 attached to a spindle 20. The machine tool main body 12 includes: a spindle 20; a spindle head 24 for rotationally driving the spindle 20 around a rotary axis parallel to the Z-direction; a column 26 for moving the spindle head 24 in the Z-direction (vertical direction); a table 28 arranged below the spindle 20 (on the negative Z-direction side) and configured to support a workpiece; and a table driving unit 30 for moving the table 28 in the X-direction and the Y-direction. Here, it is assumed that the X-direction, the Y-direction and the Z-direction are ideally orthogonal to each other. Thanks to the movement of the spindle 20 in the Z-direction and the movement of the table 28 in the X- and Y-directions, the machine tool main body 12 can machine the workpiece three-dimensionally. Here, the gravity acts in the negative Z-direction.

The tool 22 is held by a tool holder 32. The tool holder 32 is attachable to and detachable from the spindle 20, and the tool 22 is attached to the spindle 20 via the tool holder 32. By inserting the tool holder 32 into a mounting hole (not shown) formed at the tip of the spindle 20, the tool 22 is attached to the spindle 20. The tool 22 rotates together with the spindle 20.

The machine tool main body 12 is configured as a machining center in which the tool 22 attached to the spindle 20 can be changed by an automatic tool changer 34. The automatic tool changer 34 has a rotary tool magazine 36. The tool magazine 36 has a plurality of grips 36a arranged in the circumferential direction. Each of the multiple grips 36a removably holds a tool 22 via the tool holder 32. The tool holder 32 is attachable to and detachable from the grip 36a, and the tool 22 is attached to the grip 36a via the tool holder 32. Examples of the tool 22 may include non-rotating tools, drills, end mills, milling cutters and the like.

A Z-axis driving mechanism (not shown) for moving the spindle head 24 relative to the column 26 in the Z-axis direction parallel to the Z-direction is coupled to the spindle head 24. The Z-axis driving mechanism has a servomotor and a power conversion mechanism (ball screw, nut, etc.) for converting the rotational motion of the servomotor into linear motion and transmitting the motion to the spindle head 24. Further, the spindle 20 is rotated about the Z-axis parallel to the Z-direction by driving of an unillustrated spindle motor installed in the spindle head 24. Further, the tool magazine 36 is rotated (turned) about a rotary axis O by an unillustrated rotary motor.

Multiple locking grooves 38 linearly extending in the X-direction are formed on the top surface of the table 28 and arranged at predetermined intervals along the Y-direction. The workpiece is fixed (attached) to the table 28 via an unillustrated fixing jig. The fixing jig is configured to be fixed to the upper surface of the table 28 using the locking grooves 38.

The table driving unit 30 is supported by a base 40 or its peripheral components, and includes Y-axis sliders 42, a saddle 44 and X-axis sliders 46. The saddle 44 is supported so as to be movable in the Y-direction with respect to the base 40 via the Y-axis sliders 42. The table 28 is supported so as to be movable in the X-direction with respect to the saddle 44 via the X-axis sliders 46.

An unillustrated Y-axis driving mechanism for moving the saddle 44 relative to the base 40 in the Y-axis direction parallel to the Y-direction is coupled to the saddle 44. Similarly, an unillustrated X-axis driving mechanism for moving the table 28 relative to the saddle 44 in the X-axis direction parallel to the X-direction is coupled to the table 28. The Y-axis driving mechanism and the X-axis driving mechanism each have a servomotor and a power conversion mechanism (ball screw, nut, etc.) for converting the rotational motion of the servomotor into linier motion and transmitting the motion to the saddle 44 or the table 28. As the Z-axis driving mechanism, the Y-axis driving mechanism and the X-axis driving mechanism, well-known configurations can be used. The servomotors of the Z-axis driving mechanism, the Y-axis driving mechanism and the X-axis driving mechanism, the spindle motor and the rotary motor are controlled by the information processing apparatus 14 (the controller of the machine tool main body 12) that controls the machine tool main body 12.

The machine tool main body 12 is equipped with a splash guard (splash cover) 48 that covers a machining area 12a of the machine tool main body 12 and prevents chips (machining chips) generated during machining and the cutting fluid from being splattered around. The machine tool main body 12 is provided with a nozzle (not shown) that ejects the cutting fluid toward the tool 22 during machining. Though not illustrated, an opening is formed in the splash guard 48, and the splash guard 48 has an openable/closable door for covering the opening. The opening of the splash guard 48 is provided to allow for exchange of the workpiece on the table 28. The door of the splash guard 48 is closed during machining and opened at the time of exchange of the workpiece.

Further, the tool magazine 36 is provided with an image pickup device 50 constituted of a camera or the like. This image pickup device 50 images multiple members (e.g., the table, the fixing jig, the workpiece, cutting chips accumulated in the machining area 12a, etc.) existing in the machining area 12a of the machine tool main body 12. The imaging unit 56 images at least the machining target (workpiece, member) present in the machining area 12a. In the present embodiment, a tool holder 32 is attached to the image pickup device 50 so that the grip 36a of the tool magazine 36 holds the image pickup device 50 via the tool holder 32. The image pickup device 50 rotates (turns) about the rotary axis O as the tool magazine 36 turns (rotates).

Instead of attaching the image pickup device 50 to the tool magazine 36 via the tool holder 32 and the grip 36a, the image pickup device 50 may be attached directly to the tool magazine 36. In this case, it is preferable to arrange the image pickup device 50 at a position radially shifted from the rotary axis O of the tool magazine 36.

The image pickup device 50 performs imaging in a state of being attached to the rotary tool magazine 36. Therefore, the flexibility of imaging by the image pickup device 50 is improved so that the preparation time for machining can be shortened.

Figure 2:
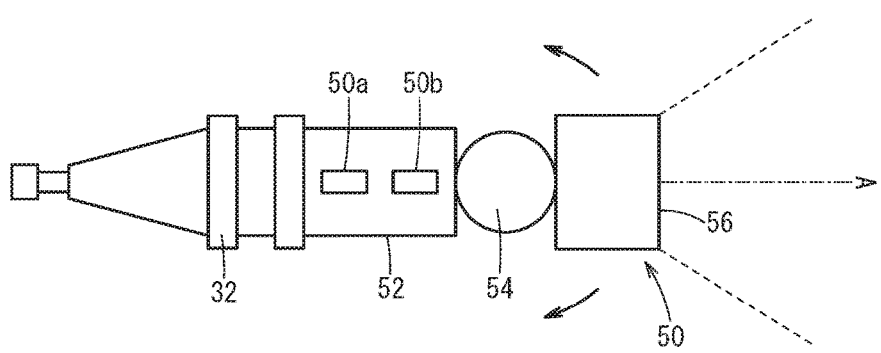
FIG. 2 is a diagram showing the configuration of an image pickup device shown in FIG. 1.

As shown in FIG. 2, the image pickup device 50 is a camera capable of changing the imaging direction. The image pickup device 50 includes a base portion 52, a posture changing unit 54 and the imaging unit 56. The imaging unit 56 includes an imaging element such as a CCD, CMOS or the like, and optical lenses (including an objective lens) though both are not illustrated. The imaging unit 56 is attached to the base portion 52 via the posture changing unit 54. The tool holder 32 holds the base portion 52, thereby holding the image pickup device 50 as a whole.

The posture changing unit 54 changes the posture of the imaging unit 56 relative to the base portion 52. Thereby, the posture changing unit 54 can change the image-taking direction (the direction of the optical axis) of the imaging unit 56. The posture changing unit 54 changes the inclination angle and the orientation of the imaging direction (the direction of the optical axis) of the imaging unit 56 relative to the axial direction A of the tool holder 32. The base portion 52 has a control unit 50a for controlling the image pickup device 50 and an actuator 50b for operating the posture changing unit 54. The control unit 50a changes the imaging direction (the direction of the optical axis) of the imaging unit 56 by controlling the operation of the actuator 50b.

The control unit 50a includes a communication unit, and transmits image data captured by the imaging unit 56 to the information processing apparatus 14. The control unit 50a and the information processing apparatus 14 may perform wired communication, but preferably use wireless communication because the image pickup device 50 turns together with the tool magazine 36. This is because wired arrangement will impose restrictions on rotation of the tool magazine 36 and cause complicate cabling.

In order to prevent the objective lens of the imaging unit 56 from getting dirty with cutting chips and the like, the imaging unit 56 has a lens cover (not shown) for protecting the objective lens therefrom. The lens cover is an opening/ closing type cover that is opened at the time of imaging and closed during machining or non-imaging. Further, after the image pickup device 50 is mounted to the spindle 20, the spindle 20 may be rotated by the spindle motor. This makes it possible to shake the cutting chips and the like off the image pickup device 50.

Figure 3:
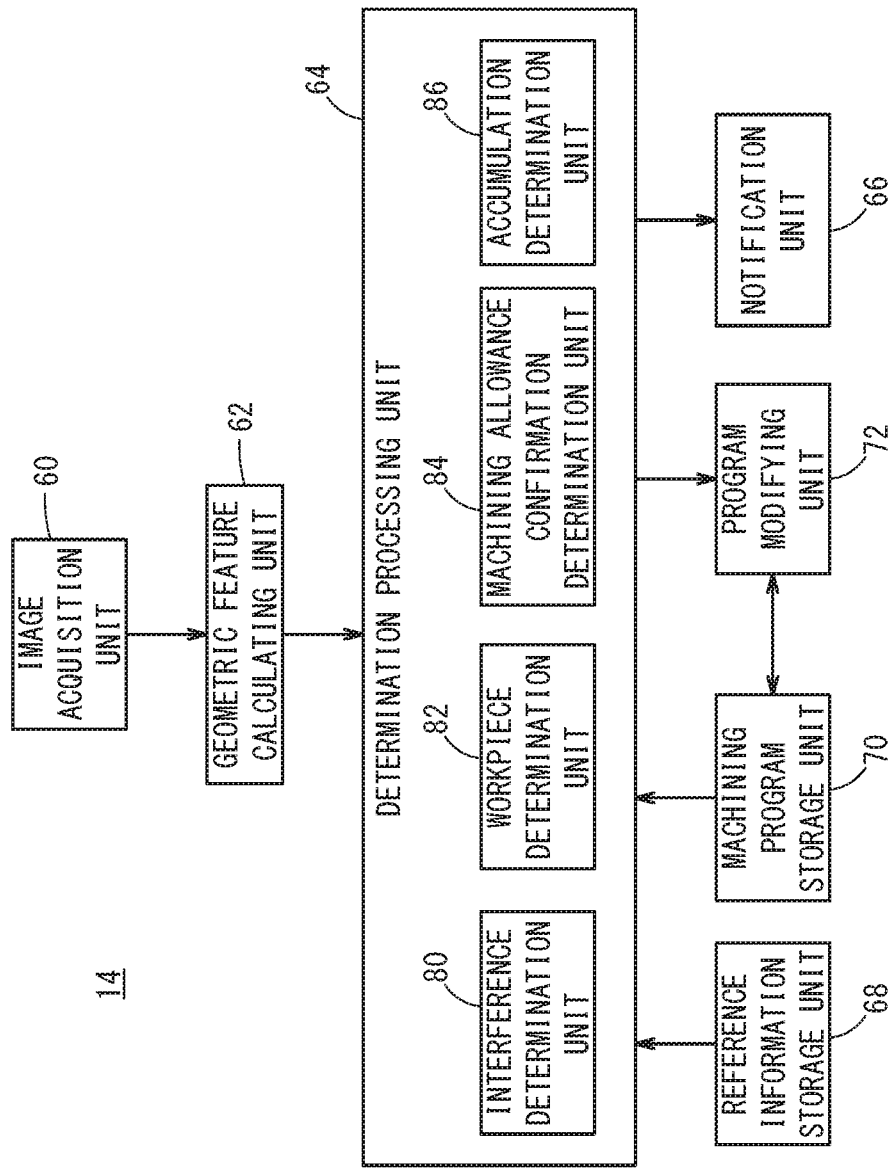
FIG. 3 is a functional block diagram showing the configuration of an information processing apparatus shown in FIG. 1.

FIG. 3 is a functional block diagram showing a configuration of the information processing apparatus 14. The information processing apparatus 14 includes a processor such as a CPU and a storage medium, and the processor executes a program stored in the storage medium to provide the functions of the information processing apparatus 14 of the present embodiment.

The information processing apparatus 14 at least includes an image acquisition unit 60, a geometric feature calculating unit 62, a determination processing unit 64, a notification unit 66, a reference information storage unit 68, a machining program storage unit 70 and a program modifying unit 72.

The image acquisition unit 60 receives and acquires the image data transmitted from the control unit 50a of the image pickup device 50. The image acquisition unit 60 acquires image data of at least two images obtained by imaging the members in the machining area 12a at different angles. The image acquisition unit 60 outputs the acquired image data of multiple images to the geometric feature calculating unit 62. The imaging method of the image pickup device 50 will be described later.

The geometric feature calculating unit (3-dimensional information calculating unit) 62 calculates the shapes (3-dimensional shapes) of multiple members in the machining area 12a and the arrangement state of the members from the image data concerning the multiple images acquired from the image acquisition unit 60. Since the technique for calculating the 3-dimensional shapes of objects and the arrangement state thereof from image data of multiple images is well known, its description is omitted. Hereinafter, for description convenience, the "shapes and arrangement state" of multiple members in the machining area 12a may also be referred to simply as "3-dimensional information" on multiple members in the machining area 12a. The geometric feature calculating unit 62 outputs the calculated 3-dimensional information of each member in the machining area 12a to the determination processing unit 64. The 3-dimensional information of each member includes at least the 3-dimensional information on the table 28, the 3-dimensional information on the workpiece, the 3-dimensional information on the fixing jig and the 3-dimensional information on the cutting chips (lumps of cutting chips) accumulated in the machining area 12a and the like.

It should be noted that the geometric feature calculating unit 62 includes an object recognition unit that performs object recognition. By use of the object recognition unit, the geometric feature calculating unit 62 identifies which part of the 3-dimensional information on multiple members corresponds to which member (e.g., the table, the workpiece and the fixing jig), and extracts 3-dimensional information for every member. In this way, 3-dimensional information on each member can be extracted from the calculated 3-dimensional information on the multiple members.

Since the cutting chips (lumps of cutting chips) accumulated in the machining area 12a do not have any specific shapes, it is impossible to perform an object recognition on the accumulated chips (lumps of chips), so that 3-dimensional information of the accumulated chips cannot be extracted. To deal with this, the geometric feature calculating unit 62 stores in advance 3-dimensional information of the multiple members in the machining area 12a when no cutting chips are accumulated, and compares this stored 3-dimensional information with the calculated 3-dimensional information on the multiple members in the machining area 12a, whereby it is possible to determine the 3-dimensional information on the accumulated cutting chips (lumps of cutting chips). By calculating 3-dimensional information on the multiple members in the machining area 12a before machining, the geometric feature calculating unit 62 obtains the 3-dimensional information on the multiple members free from accumulation of chips in the machining area 12a. The cutting chips deposit mainly on the table 28, the saddle 44 and the base 40.

The determination processing unit 64 determines whether or not there is any predetermined fault based on the 3-dimensional information of each member in the machining area 12a. The function of the determination processing unit 64 will be detailed later.

The notification unit 66 notifies an operator of the determination result of the determination processing unit 64. The notification unit 66 may have a display unit and display information of the determination result on the display unit. Alternatively, the notification unit 66 may include a speaker and output a sound corresponding to the determination result of the determination processing unit 64 from the speaker. Furthermore, the notification unit 66 may have a light emitting unit that emits multiple colors and cause the light emitting unit to emit light in a color corresponding to the determination result from the determination processing unit 64. The notification unit 66 may give notice by using a notification method of changing the intensity of light emission or blinking operation, a notification method with seven-segment displays and others.

The reference information storage unit 68 stores therein reference information serving as criteria for judgment made by the determination processing unit 64 as to whether or not there is any fault. The reference information storage unit 68 stores the 3-dimensional shape of the tool 22 to be used for the current machining process, the 3-dimensional shape of the object (workpiece) to be machined (the object to be machined as a reference, the object to be machined corresponding to the machining program to be executed in the current machining process) and the feature data representing the features (e.g., the feature of shape) of the object to be machined in the current machining process. Here, the reference information storage unit 68 may also store the feature data representing the features (e.g., the feature of shape) of the fixing jig for attaching (fixing) the object (workpiece) to be machined in the current machining process, to the table 28.

The reference information storage unit 68 has also stored information on the attachment state of the workpiece to the table 28 in a case where the workpiece to be machined is correctly attached to the table 28. Here, the reference information storage unit 68 may also store information on the attachment state of the fixing jig to the table 28 when the fixing jig for fixing the workpiece is correctly attached to the table 28. The 3-dimensional shape of the tool 22, the feature data of the fixing jig and the attachment state information may be entered, for example, by supplemental use of numerical entry from the information processing apparatus 14, or based on the image data obtained by the image pickup device 50.

The machining program storage unit 70 store therein machining programs for machining workpieces using tools 22. The machining program storage unit 70 may store a plurality of machining programs, but should store at least a machining program to be executed for causing the machine tool main body 12 to machine the workpiece (the object to be machined). The machining program stored in the machining program storage unit 70 is used for a determination made by the determination processing unit 64.

The program modifying unit 72 modifies the machining program stored in the machining program storage unit 70 based on the determination result from the determination processing unit 64. The program modifying unit 72 reads out the machining program from the machining program storage unit 70 and modifies it, and then stores the modified machining program in the machining program storage unit 70.

Next, the determination processing unit 64 will be described in detail. The determination processing unit 64 includes an interference determination unit 80, a workpiece determination unit (object-to-be-machined determination unit) 82, a machining allowance confirmation determination unit 84 and an accumulation determination unit 86.

The interference determination unit 80 reads the machining program to be executed for causing the machine tool main body 12 to machine the workpiece, from the machining program storage unit 70. The interference determination unit 80 reads the 3-dimensional shape of the tool 22 to be attached to the spindle 20, from the reference information storage unit 68. The tool 22 to be attached to the spindle 20 is a tool 22 that is used to machine the workpiece in accordance with the machining program that is going to be executed, and is a predetermined tool 22.

The interference determination unit 80 analyzes the machining program read out from the machining program storage unit 70, and determines whether or not the tool 22 will interfere with at least one of the members in the machining area 12a when the tool 22 is relatively moved to the table 28 in accordance with the machining program. The interference determination unit 80, based on the 3-dimensional information of the multiple members in the machining area 12a, which is calculated by the geometric feature calculating unit 62, and the 3-dimensional shape of the tool 22 obtained from the reference information storage unit 68, makes a determination on interference. Here, the interference determination unit 80 can recognize the movement path of the tool 22 relative to the table 28 by analyzing the machining program.

Further, the interference determination unit 80 analyzes the machining program read out from the machining program storage unit 70, and determines whether a direction of interference in which the tool 22 interferes with the workpiece is correct or not when the tool 22 is moved relative to the table 28 according to the machining program. The interference determination unit 80 makes a determination on the direction of interference, based on the 3-dimensional information on the multiple members in the machining area 12a, which is calculated by the geometric feature calculating unit 62, and the 3-dimensional shape of the tool 22 retrieved from the reference information storage unit 68. For example, if it is determined that the tool 22 will interfere with the workpiece in the X-axis direction or the Y-axis direction even though the tool 22 is a drill tool, it is determined that the direction of interference is abnormal.

The notification unit 66 may notify the operator of the determination result from the interference determination unit 80. When it is determined that the tool 22 will interfere with at least one of the members in the machining area 12a, the notification unit 66 may give notice of the fact. Alternatively, when it is determined that the tool 22 will not interfere with any of the multiple members in the machining area 12a, the notification unit 66 may give notice of the fact. The notification unit 66 may notify the operator which member will interfere with the tool 22. When it is determined that the direction of interference in which the tool 22 interferes with the workpiece is not correct, the notification unit 66 may give notice of the fact. Alternatively, when it is determined that the direction of interference in which the tool 22 interferes with the workpiece is correct, the notification unit 66 may give notice of the fact.

The workpiece determination unit 82 reads the feature data of the workpiece supported on the table 28 from the reference information storage unit 68. The workpiece supported on the table 28 is an object to be machined in accordance with the machining program that is going to be executed, and is a predetermined workpiece (a predetermined object to be machined).

The workpiece determination unit 82 determines whether or not the predetermined workpiece is attached to the table 28. The workpiece determination unit 82 makes this determination based on the 3-dimensional information on the workpiece, which is calculated by the geometric feature calculating unit 62, and the feature data of the workpiece retrieved from the reference information storage unit 68. That is, the workpiece determination unit 82 determines whether or not the calculated 3-dimensional shape of the workpiece coincides with the retrieved workpiece feature data within a predetermined tolerance. If they coincide with each other, it is determined that the predetermined workpiece is mounted on the table 28. Thus, it is possible to confirm whether a workpiece different from the predetermined workpiece to be machined in accordance with the machining program is attached to the table 28.

Herein, the workpiece determination unit 82 may read out the feature data on the predetermined fixing jig from the reference information storage unit 68. Then, the workpiece determination unit 82 may determine whether or not the predetermined workpiece is attached to the table 28 by the predetermined fixing jig. The workpiece determination unit 82 makes this determination using the 3-dimensional information of the fixing jig, which is calculated by the geometric feature calculating unit 62, and the feature data of the fixing jig retrieved from the reference information storage unit 68.

When determining that the predetermined workpiece has been attached to the table 28, the workpiece determination unit 82 determines whether or not the workpiece is placed in a predetermined attachment state. Specifically, the workpiece determination unit 82 retrieves the information (predetermined attachment state information) on the attachment state of the workpiece to the table 28 from the reference information storage unit 68, and makes this determination based on the retrieved attachment state information and the 3-dimensional information of the table 28 and the workpiece, which is calculated by the geometric feature calculating unit 62. For example, if the workpiece is attached to a position deviated from the predetermined attachment position, or if the workpiece is attached in a direction deviated from the predetermined attachment direction, or in some other cases, then the workpiece determination unit 82 determines that the workpiece is not attached in the predetermined attachment state.

Here, when determining that the workpiece is attached to the table 28 by a predetermined fixing jig, the workpiece determination unit 82 may determine whether or not the fixing jig is mounted in a predetermined attachment state. Specifically, the workpiece determination unit 82 retrieves the information (predetermined attachment state information) on the attachment state of the fixing jig to the table 28 from the reference information storage unit 68, and makes this determination based on the retrieved attachment state information and the 3-dimensional information of the table 28 and the fixing jig, which is calculated by the geometric feature calculating unit 62. For example, if the fixing jig is attached to a position deviated from the predetermined attachment position, or if the fixing jig is attached in a direction deviated from the predetermined attachment direction, or in some other cases, then the workpiece determination unit 82 determines that the fixing jig is not attached in the predetermined attachment state.

The notification unit 66 may notify the operator of the determination result of the workpiece determination unit 82. When it is determined that the predetermined workpiece is not attached to the table 28, the notification unit 66 may give notice of the fact. When it is determined that the predetermined workpiece is attached to the table 28, the notification unit 66 may give notice of the fact. Further, when it is determined that the workpiece is not attached by the predetermined fixing jig, the notification unit 66 may give notice of the fact. When it is determined that the workpiece is attached by the predetermined fixing jig, the notification unit 66 may give notice of the fact.

When it is determined that the workpiece is not attached in the predetermined attachment state, the notification unit 66 may give notice of the fact. When it is determined that the workpiece is attached in the predetermined attachment state, the notification unit 66 may give notice of the fact. When it is determined that the fixing jig is not attached in the predetermined attachment state, the notification unit 66 may give notice of the fact. When it is determined that the fixing jig is attached in the predetermined attachment state, the notification unit 66 may give notice of the fact.

The machining allowance confirmation determination unit 84 reads from the machining program storage unit 70 the machining program to be executed for causing the machine tool main body 12 to machine the workpiece. The machining allowance confirmation determination unit 84 reads the 3-dimensional shape of the workpiece supported on the table 28 from the reference information storage unit 68.

The machining allowance confirmation determination unit 84 compares the 3-dimensional information on the workpiece calculated by the geometric feature calculating unit 62 with the 3-dimensional shape of the workpiece retrieved from the reference information storage unit 68, to thereby confirm (calculate) the machining allowance of the workpiece attached on the table 28. The machining allowance confirmation determination unit 84 analyzes the machining program retrieved from the machining program storage unit 70 and confirms an allowable range of the machining allowance specified by the machining program. Then, the machining allowance confirmation determination unit 84 determines whether or not the machining allowance of the workpiece attached to the table 28 falls within the allowable range of the machining allowance specified by the machining program. When the machining allowance of the workpiece attached to the table 28 is greater than the allowable range of the machining allowance specified by the machining program, the tool 22 attached to the spindle 20 will interfere with the workpiece while it is not rotating, and consequently, there is a risk of the tool 22 being damaged. On the contrary, if the machining allowance of the workpiece attached to the table 28 is smaller than the allowable range of the machining allowance specified by the machining program, the machining efficiency may be lowered. Here, it should be noted that when the workpiece is a casting, even if the feature data indicating the features is the same, the size of the article is prone to vary, and the machining allowance also varies accordingly.

When the machining allowance confirmation determination unit 84 determines that the machining allowance of the workpiece attached to the table 28 is out of the allowable range of the machining allowance specified by the machining program, the program modifying unit 72 automatically modifies the machining program stored in the storage unit 70. The program modifying unit 72 modifies the machining program so that the machining allowance of the workpiece attached to the table 28 falls within the allowable range of the machining allowance specified by the machining program.

When the machining allowance of the workpiece attached to the table 28 is determined to be out of the allowable range of the machining allowance specified by the machining program, the notification unit 66 may give notice of this fact. When the machining allowance of the workpiece attached to the table 28 is determined to fall within the allowable range of the machining allowance specified by the machining program, the notification unit 66 may give notice of the fact. Further, the notification unit 66 may notify that the machining program has been modified.

In a configuration where the information processing apparatus 14 is different from the controller for controlling the machine tool main body 12, when the machining program is modified by the program modifying unit 72, the information processing apparatus 14 transmits the modified machining program stored in the machining program storage unit 70 to the controller for controlling the machine tool main body 12. Thereby, the controller for controlling the machine tool main body 12 can perform machining in accordance with the modified machining program.

The accumulation determination unit 86 calculates the accumulation amount of chips based on the 3-dimensional information of the chips (lumps of chips) deposited in the machining area 12a, which is calculated by the geometric feature calculating unit 62. Then, the accumulation determination unit 86 determines whether or not the calculated accumulation amount of chips is equal to or greater than a threshold. Thus, it is possible to determine whether or not cleaning is necessary.

The notification unit 66 may notify the operator of the determination result from the accumulation determination unit 86. When the accumulation amount of chips is equal to or greater than the threshold, the notification unit 66 may notify the fact. Or, the notification unit may give a notification when the accumulation amount of chips is less than the threshold value. Thus, the operator can recognize the arrival of cleaning timing. Further, when the accumulation determination unit 86 determines that the accumulation amount of chips exceeds the threshold, the controller (information processing apparatus 14) of the machine tool main body 12 may cause the liquid such as dielectric working fluid or the like to be supplied into the machining area 12a. As a result, the chips accumulated in the machining area 12a can be removed. In the case where a chip removing mechanism such as a chip conveyor is provided in the machine tool main body 12, the chips may be removed by operating the chip removing mechanism.

Here, the image pickup device 50 takes multiple images of the members in the machining area 12a from different angles. Thus, it is possible to obtain multiple pieces of image data concerning the images of the members in the machining area 12a taken from different angles. For example, the image pickup device 50 can pick up images while the tool magazine 36 is turned, whereby it is possible to capture multiple pieces of image data concerning the images taken from different angles for multiple members in the machining area 12*a*. Therefore, it is possible to calculate 3-dimensional information of the multiple members in the machining area 12*a*. At this time, the image pickup device 50 may image the interior of the machining area 12*a* by changing the posture of the imaging unit 56 (changing the image-capturing direction).

Alternatively, by imaging during movement of the table 28, the image pickup device 50 can obtain multiple pieces of image data concerning the images, taken from different angles, of the table 28, the fixing jig and the workpiece in the machining area 12*a*. In this case, the 3-dimensional information only on the table 28, the fixing jig and the workpiece can be obtained. By performing image-capturing while the posture of the imaging unit 56 is being changed, it is possible to obtain the 3-dimensional information on the other multiple members inside the machining area 12*a*.

In this way, the image pickup device 50 can obtain more precise 3-dimensional information by taking images using combination of at least two of rotation of the tool magazine 36; movement of the table 28; and posture change of the imaging unit 56. It should be noted that the image pickup device 50 can image multiple members in the machining area 12*a* from different angles by simply taking images while changing the posture of the imaging unit 56.

Here, the image pickup device 50 may capture a plurality of images by shooting a video, or may capture a plurality of images by continuous imaging at a high shutter speed and a high frame rate. Here, the machine tool main body 12 performs preparation operation for machining before machining. In this preparation operation, the spindle 20 and the table 28 are moved to predetermined original positions, and the tool magazine 36 is turned so as to attach the tool 22 to be used for machining to the spindle 20. Therefore, at the time of the preparation operation, the image pickup device 50 can take the interior of the machining area 12*a*, so that it becomes unnecessary to separately provide a time for image-taking. Consequently, it is possible to further shorten the preparation time for machining.

Figure 4:
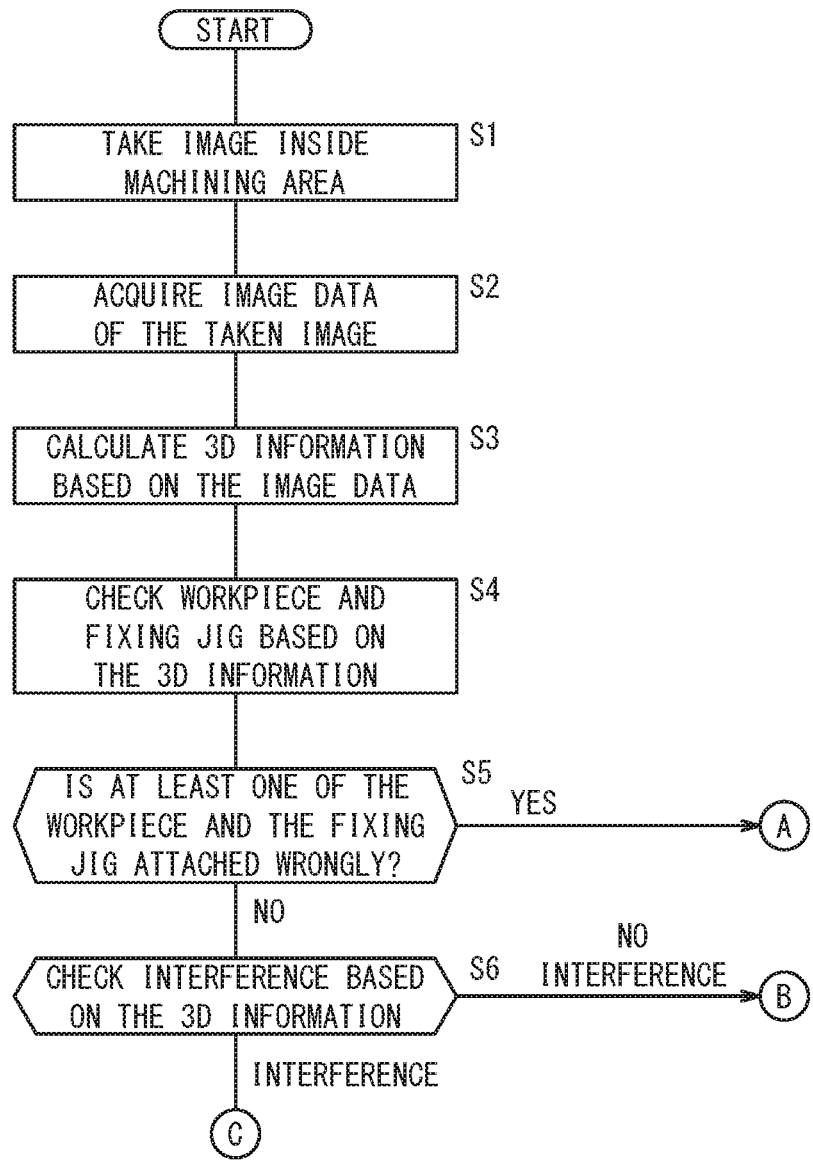
FIG. 4 is a flowchart showing a first control operation of the machine tool system shown in FIG. 1.

Referring next to the flowcharts shown in FIGS. 4 and 5, a first control operation of the machine tool system 10 will be described. Before machining (e.g., immediately before machining), the image pickup device 50 images the machining area 12*a* at step S1 of FIG. 4. The image pickup device 50 performs imaging according to the commands from the information processing apparatus 14. At this time, the image pickup device 50 takes multiple images of members in the machining area 12*a* from different angles, and transmits image data of the multiple taken images to the information processing apparatus 14.

At step S2 the image acquisition unit 60 acquires the image data of the multiple images transmitted from the image pickup device 50. The image acquisition unit 60 outputs the acquired image data of the multiple images to the geometric feature calculating unit 62. At step S3 the geometric feature calculating unit 62 calculates 3-dimensional information on the multiple members in the machining area 12*a* from the acquired image data of the multiple images. The geometric feature calculating unit 62 outputs the calculated 3-dimensional information on the multiple members to the determination processing unit 64.

At step S4 the workpiece determination unit 82 of the determination processing unit 64 determines, based on the 3-dimensional information on the workpiece and the fixing jig of the 3-dimensional information on the multiple members calculated at step S3, whether or not a predetermined workpiece and a predetermined fixing jig are attached to the table 28. The workpiece determination unit 82 makes this determination by using the feature data of the workpiece and the fixing jig stored in the reference information storage unit 68.

At this time, based on the 3-dimensional information on the workpiece and the fixing jig calculated at step S3, the workpiece determination unit 82 determines whether or not the workpiece is attached in a predetermined attachment state. The workpiece determination unit 82 makes this determination using the information on the attachment state of the workpiece and the fixing jig to the table 28, which is stored in the reference information storage unit 68.

At step S5 the workpiece determination unit 82 determines whether or not at least one of the workpiece and the fixing jig is attached in a wrong manner. If it is determined at step S5 that at least one of the workpiece and the fixing jig is attached wrongly, the control proceeds to step S12 in FIG. 5, and the notification unit 66 notifies the operator of the fact. For example, if the workpiece determination unit 82 determines that the predetermined workpiece is not attached to the table 28, the notification unit 66 notifies the operator of the fact. Further, if the workpiece determination unit 82 determines that the workpiece is not attached in the predetermined attachment state, the notification unit 66 notifies the operator of the fact.

When it is determined at step S5 that the workpiece and the fixing jig are correctly attached, the control proceeds to step S6, at which the interference determination unit 80 of the determination processing unit 64 determines, based on the 3-dimensional information on the multiple members, whether or not the tool 22 will interfere with at least one of the members in the machining area 12*a* when the tool 22 is relatively moved to the table 28 in accordance with the machining program. Here, the 3-dimensional shape of the tool 22 can be retrieved from the reference information storage unit 68.

Figure 5:
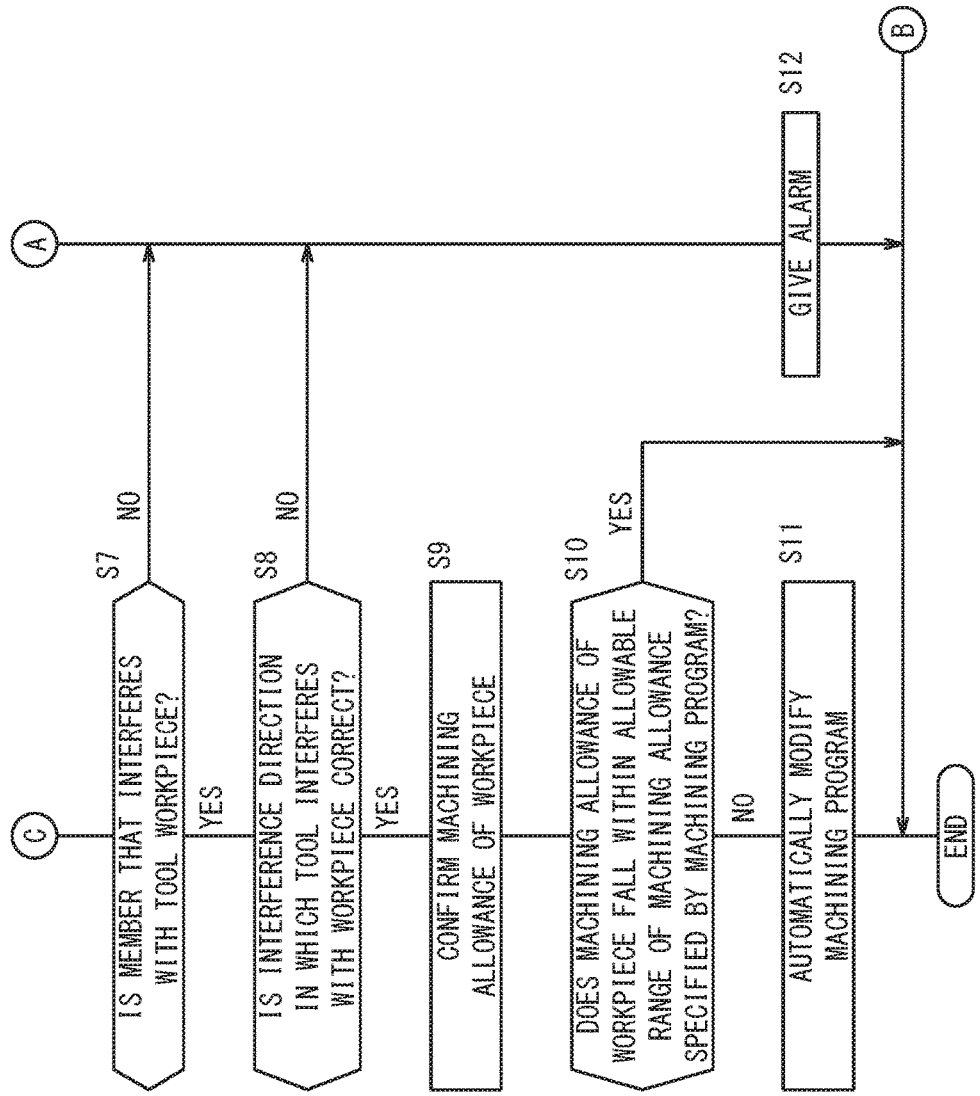
FIG. 5 is a flowchart showing a first control operation of the machine tool system shown in FIG. 1.

When it is determined at step S6 that the tool 22 will interfere with at least one of the members in the machining area 12*a*, the control proceeds to step S7 in FIG. 5, at which it is determined whether the one member with which the tool 22 will interfere is the workpiece or not.

When it is determined at step S7 that the one member with which the tool 22 will interfere is not the workpiece, the control proceeds to step S12, at which the notification unit 66 informs the operator that the tool 22 will interfere with a member other than the workpiece. For example, the notification unit 66 may notify the operator which member will interfere with the tool 22.

On the other hand, when it is determined at step S7 that the one member with which the tool 22 will interfere is the workpiece, the control proceeds to step S8, at which the interference determination unit 80 determines whether a direction of interference in which the tool 22 will interfere with the workpiece is normal or not. When the direction of interference between the workpiece and the tool 22 is abnormal, for example, if the tool 22 interferes with the workpiece in the X-axis direction or the Y-axis direction even though the tool 22 is a drill tool, the control goes to step S12 at which the notification unit 66 notifies the fact. When the direction of interference in which the workpiece and the tool 22 will interfere with each other is normal at step S8, the control proceeds to step S9 at which the machining allowance confirmation determination unit 84 confirms (calculates) the machining allowance of the workpiece attached to the table 28. The machining allowance confirmation determination unit 84 compares the 3-dimensional information on the workpiece, among the 3-dimensional information on the multiple members calculated at step S3, with the 3-dimensional shape acquired from the reference information storage unit 68, so as to confirm the machining allowance of the workpiece attached to the table 28.

At step S10, the machining allowance confirmation determination unit 84 of the determination processing unit 64 determines whether or not the machining allowance of the workpiece confirmed at step S9 falls within the allowable range of the machining allowance specified by the machining program.

At step S10, when it is determined that the machining allowance of the workpiece falls outside the allowable range of the machining allowance specified by the machining program, the control proceeds to step S11. At step S11, the program modifying unit 72 automatically modifies the machining program stored in the machining program storage unit 70. The program modifying unit 72 modifies the machining program so that the machining allowance of the workpiece attached to the table 28 falls within the allowable range specified by the machining program. More specifically, when the determination at step S10 is negative or NO, one of the following two possible cases is considered to occur: a first possible case that the machining efficiency will be lowered due to a small machining allowance of the workpiece; and a second possible case that the not-rotating tool will interfere with the workpiece due to a large machining allowance of the workpiece. Therefore, these possible cases are excluded by modifying the machining program.

When it is determined at step S10 that the machining allowance of the workpiece is outside the allowable range of the machining allowance specified by the machining program or when the machining program is modified at step S11, the notification unit 66 may give notice of the fact.

When it is determined at step S6 that interference does not occur, or when it is determined at step S10 that the machining allowance of the workpiece is within the allowable range of the machining allowance specified by the machining program, or when the operation at step S11 or S12 is effected, the control sequence is terminated.

Next, Referring to the flowchart shown in FIG. 6, a second control operation of the machine tool system 10 will be described. At step S21, the image pickup device 50 takes images of the machining area 12a, and transmits image data of the multiple taken images to the information processing apparatus 14. At step S22, the image acquisition unit 60 acquires the image data of the multiple images transmitted from the image pickup device 50 and outputs the data to the geometric feature calculating unit 62. At step S23, the geometric feature calculating unit 62 calculates 3-dimensional information on multiple members in the machining area 12a from the acquired image data of the multiple images, and outputs the 3-dimensional information to the determination processing unit 64. The operations from steps S21 to S23 are the same as those from steps S1 to S3 shown in FIG. 4.

At step S24, the accumulation determination unit 86 of the determination processing unit 64 calculates the accumulation amount of chips, based on the 3-dimensional information on the chips deposited in the machining area 12a, of the 3-dimensional information of the multiple members calculated at step S23. At step S25, the accumulation determination unit 86 determines whether or not the calculated accumulation amount of the chips is equal to or greater than a threshold. When it is determined at step S25 that the accumulation amount of chips is equal to or greater than the threshold, the control proceeds to step S26, and the notification unit 66 notifies the operator of the fact. As a result, the operator can perform removal of the accumulation. Here, when it is determined at step S25 that the accumulation amount of chips is equal to or greater than the threshold, the controller (information processing apparatus 14) that controls the machine tool main body 12 may supply a liquid such as a dielectric working fluid to the machining area 12a in order to remove the chips accumulated therein. In a case where a chip removing mechanism such as a chip conveyor is provided in the machine tool main body 12, the chip may be removed by operating the chip removing mechanism.

[Modifications]

The above embodiment may be modified as follows.

<Modification 1>

Though in the above embodiment, the case where one image pickup device 50 is provided in the tool magazine 36 has been described as an example, multiple image pickup devices 50 may be provided in the tool magazine 36. This improves the accuracy with which the geometric feature calculating unit 62 calculates the 3-dimensional information on the multiple members in the machining area 12a.

<Modification 2>

Though the image pickup device 50 takes images of multiple members in the machining area 12a by receiving light directly from the multiple members, a reflective plate 90 such as a mirror, i.e., reflection of light, may be used to take images of the members in the machining area 12a. That is, the image pickup device 50 may indirectly take images of the members in the machining area 12a via the reflective plate 90. The reflective plate 90 may be installed inside the machining area 12a. Alternatively, the reflective plate 90 may be installed outside the machining area 12a, and oriented so that the interior of the machining area 12a can be reflected through, for example, the opening in the splash guard 48 or a window for allowing observation of the machining area 12a. In the example shown in FIG. 1, the reflective plate 90 is provided on the inner surface of the splash guard 48. Owing thereto, use of the reflective plate 90 makes it possible to take images of members even if there are some members that are difficult for the image pickup device 50 to take via direct light. Here, the reflective plate 90 may be of a fixed type, or may be of a manually or automatically movable type.

<Modification 3>

The information processing apparatus 14 may be configured to calculate 3-dimensional information on multiple members in the machining area 12a for a plurality of machine tool main bodies 12 and determine whether there are predetermined faults. In this case, the information processing apparatus 14 is adapted to be able to communicate with the image pickup device 50 provided in each of the multiple machine tool main bodies 12 and also communicate with the multiple controllers that control the multiple machine tool main bodies 12. The information processing apparatus 14 used in this modification may be the numerical controller in any one of the multiple machine tool main bodies 12, or may employ a controller (for example, a microcomputer or the like) different from the numerical controller and which is installed in the one machine tool main body 12. Alternatively, it is also possible to use a control apparatus such as a terminal for central production facility management in the factory where the machine tool main bodies 12 are installed.

<Modification 4>

The determination processing unit 64 includes the interference determination unit 80, the workpiece determination unit 82, the machining allowance confirmation determination unit 84 and the accumulation determination unit 86. However, the determination processing unit 64 may include at least one of the above units.

<Modification 5>

The modifications 1 to 4 may be optionally combined as long as no technical inconsistency occurs.

As described above, the machine tool system (10) described in the above embodiment and the modifications 1 to 5 includes: a machine tool main body (12) for machining a workpiece supported on a table (28) by using a tool (22) detachably attached to a spindle (20); and an information processing apparatus (14). The machine tool main body (12) includes a rotary tool magazine (36) in which a plurality of grips (36a) each capable of holding the tool (22) to be attached to the spindle (20) are provided along the circumferential direction, and an image pickup device (50) that is arranged in the tool magazine (36) and configured to take an image of a plurality of member including at least the workpiece in a machining area (12a) of the machine tool main body (12). The information processing apparatus (14) includes a geometric feature calculating unit (62) configured to calculate the shapes of the multiple members in the machining area (12a) and the arrangement state thereof, based on image data of the image taken by the image pickup device (50).

As a result, the flexibility of image-taking by the image pickup device (50) is improved, and the preparation time for performing the machining is shortened.

The information processing apparatus (14) may further include a determination processing unit (64) configured to determine whether or not there is a predetermined fault, based on the shapes and the arrangement state of the multiple members in the machining area (12a), calculated by the geometric feature calculating unit (62). As a result, it is possible to judge whether or not there is a predetermined fault based on the shapes and the arrangement state of the multiple members in the machining area (12a).

The information processing apparatus (14) may include a notification unit (66) configured to notify the determination result obtained from the determination processing unit (64). This enables the operator to recognize the determination result of the determination processing unit (64).

The determination processing unit (64) may include an interference determination unit (80) configured to determine whether or not the tool (22) will interfere with the multiple members in the machining area (12a) when the tool (22) is relatively moved to the table (28) in accordance with a machining program that is going to be executed, based on the shapes and the arrangement state of the multiple items, calculated by the geometric feature calculating unit (62). As a result, it is possible to determine beforehand whether the tool (22) will interfere with the multiple members in the machining area (12a), and hence prevent the tool (22) and others from being damaged.

The determination processing unit (64) may include an interference determination unit (80) configured to determine whether or not a direction of interference in which the tool (22) will interfere with the workpiece is correct when the tool (22) is relatively moved to the table (28) in accordance with a machining program that is going to be executed, based on the shapes and the arrangement state of the multiple items, calculated by the geometric feature calculating unit (62). As a result, it is possible to determine beforehand whether or not the interference direction between the tool (22) and the workpiece is correct.

The determination processing unit (64) may include a workpiece determination unit (82) configured to determine whether or not the predetermined workpiece is attached to the table (28) and whether or not the workpiece is attached in a predetermined attachment state, based on the shapes and the arrangement state of the multiple members in the machining area (12a), calculated by the geometric feature calculating unit (62). As a result, it is possible to determine beforehand whether or not the predetermined workpiece is correctly attached to the table (28), and hence prevent wasteful machining from occurring.

The image pickup device (50) is configured to take an image of, together with the members, a fixing jig for attaching the workpiece to the table (28). The workpiece determination unit (82) may be configured to determine whether or not the workpiece is attached to the table (28) by using the predetermined fixing jig and whether or not the fixing jig is attached in a predetermined attachment state, based on the shapes and the arrangement state of the multiple members in the machining area (12a), calculated by the geometric feature calculating unit (62). As a result, it is possible to determine beforehand whether or not the predetermined fixing jig is correctly attached to the table (28), and hence prevent wasteful machining from occurring.

The determination processing unit (64) may include a machining allowance confirmation determination unit (84) configured to confirm the machining allowance of the workpiece based on the shapes and the arrangement state of the multiple members in the machining area (12a) calculated by the geometric feature calculating unit (62), and determine whether or not the confirmed machining allowance of the workpiece falls within an allowable range of the machining allowance specified by a machining program that is going to be executed. The information processing apparatus (14) may further include a program modifying unit (72) configured to modify the machining program if the machining allowance confirmation determination unit (84) determines that the confirmed machining allowance of the workpiece is out of the allowable range of the machining allowance specified by the machining program that is going to be executed. When the workpiece is a casting, there are cases where the machining allowance varies. However, according to this configuration, in a case where the machining allowance of the workpiece is outside the allowable range of the machining allowance specified by the machining program, the machining program can be modified, and hence it is possible to avoid interference between the tool (22) and the workpiece.

The image pickup device (50) is configured to take an image of chips accumulated in the machining area (12a). The determination processing unit (64) may include an accumulation determination unit (86) configured to calculate the accumulation amount of the chips based on the shapes and the arrangement state of the multiple members in the machining area (12a), calculated by the geometric feature calculating unit (62), and determine whether or not the calculated accumulation amount is greater than or equal to a threshold. This makes it possible to determine whether cleaning for removing chips is necessary or not.

The image pickup device (50) may be held by the grip (36a) so as to be detachably attached to the tool magazine (36) and configured to take an image of the multiple members in the machining area (12a) while being held by the tool magazine (36).

The image pickup device (50) may include a plurality of image pickup devices provided in the tool magazine (36). This makes it possible to obtain image data of the multiple images taken from different angles relative to the members in a short time. Further, it is possible to improve the accuracy with which the geometric feature calculating unit (62)

calculates the shapes and the arrangement state of the multiple members in the machining area (12a).

The image pickup device (50) may include a posture changing unit (54) configured to change the image-taking direction, and an actuator (50b) configured to drive the posture changing unit (54). This makes it possible to improve the accuracy with which the geometric feature calculating unit (62) calculates the shapes and the arrangement state of the multiple members in the machining area (12a).

The machine tool main body (12) may include a reflective plate (90) for reflecting light. The image pickup device (50) may be configured to take an image of the members in the machining area (12a) via the reflective plate (90). Thus, by use of the reflective plate (90), it is possible to take images of members even if there are some members that are difficult for the image pickup device (50) to image directly.

The information processing apparatus (14) may be a controller for controlling the machine tool main body (12) for machining the workpiece, or another controller different from the controller for controlling the machine tool main body.

The information processing apparatus (14) may be configured to calculate the shapes of the multiple members in the machining area (12a) and the arrangement state thereof, for each of multiple machine tool main bodies (12) and determine whether or not there is a predetermined fault for each of the machine tool main bodies (12).

While the invention has been particularly shown and described with reference to a preferred embodiment, it will be understood that variations and modifications can be effected thereto by those skilled in the art without departing from the scope of the invention as defined by the appended claims.

What is claimed is:

1. A machine tool system comprising:
a machine tool main body configured to machine a workpiece supported on a table by using a tool detachably attached to a spindle; and
an information processing apparatus, wherein,
the machine tool main body includes:
a rotary tool magazine in which a plurality of grips each configured to hold the tool to be attached to the spindle are provided along a circumferential direction of the rotary tool magazine; and
an image pickup device arranged in the tool magazine independent of the tool to be attached to the spindle to machine the workpiece and configured to take an image of multiple members including at least the workpiece in a machining area of the machine tool main body; and
the information processing apparatus includes a geometric feature calculating unit configured to calculate shapes of the multiple members located in the machining area and an arrangement state thereof, based on image data of the image taken by the image pickup device before machining of the workpiece wherein the image pickup device remains arranged in the tool magazine during machining.

2. The machine tool system according to claim 1, wherein the information processing apparatus further includes a determination processing unit configured to determine whether or not there is a predetermined fault, based on the shapes and the arrangement state of the multiple members, calculated by the geometric feature calculating unit.

3. The machine tool system according to claim 2, wherein the information processing apparatus includes a notification unit configured to notify a determination result obtained from the determination processing unit.

4. The machine tool system according to claim 2, wherein the determination processing unit includes an interference determination unit configured to determine whether or not the tool will interfere with the multiple members when the tool is relatively moved to the table in accordance with a machining program that is going to be executed, based on the shapes and the arrangement state of the multiple members, calculated by the geometric feature calculating unit.

5. The machine tool system according to claim 2, wherein the determination processing unit includes an interference determination unit configured to determine whether or not a direction of interference in which the tool will interfere with the workpiece is correct when the tool is relatively moved to the table in accordance with a machining program that is going to be executed, based on the shapes and the arrangement state of the multiple members, calculated by the geometric feature calculating unit.

6. The machine tool system according to claim 2, wherein the determination processing unit includes a workpiece determination unit configured to determine whether or not the predetermined workpiece is attached to the table and whether or not the workpiece is attached in a predetermined attachment state, based on the shapes and the arrangement state of the multiple members, calculated by the geometric feature calculating unit.

7. The machine tool system according to claim 6, wherein:
the image pickup device is configured to take an image of, together with the members, a fixing jig configured to attach the workpiece to the table;
the workpiece determination unit is configured to determine whether or not the workpiece is attached to the table by using the predetermined fixing jig and whether or not the fixing jig is attached in a predetermined attachment state, based on the shapes and the arrangement state of the multiple members, calculated by the geometric feature calculating unit.

8. The machine tool system according to claim 2, wherein:
the determination processing unit includes a machining allowance confirmation determination unit configured to confirm a machining allowance of the workpiece based on the shapes and the arrangement state of the multiple members, calculated by the geometric feature calculating unit, and determine whether or not the confirmed machining allowance of the workpiece falls within an allowable range of the machining allowance specified by a machining program that is going to be executed; and
the information processing apparatus further includes a program modifying unit configured to modify the machining program if the machining allowance confirmation determination unit determines that the confirmed machining allowance of the workpiece is out of the allowable range of the machining allowance specified by the machining program that is going to be executed.

9. The machine tool system according to claim 2, wherein:
the image pickup device is configured to take an image of chips accumulated in the machining area; and
the determination processing unit includes an accumulation determination unit configured to calculate an accumulation amount of the chips based on the shapes and the arrangement state of the multiple members, calculated by the geometric feature calculating unit, and determine whether or not the calculated accumulation amount is greater than or equal to a threshold.

10. The machine tool system according to claim 1, wherein the image pickup device is held by the grip so as to be detachably attached to the tool magazine, and configured to take an image of the multiple members while being held by the tool magazine.

11. The machine tool system according to claim 1, wherein the image pickup device comprises a plurality of image pickup devices provided in the tool magazine.

12. The machine tool system according to claim 1, wherein the image pickup device includes:
   a posture changing unit configured to change an image-taking direction; and
   an actuator configured to drive the posture changing unit.

13. The machine tool system according to claim 1, wherein:
   the machine tool main body includes a reflective plate configured to reflect light; and
   the image pickup device is configured to take an image of the members via the reflective plate.

14. The machine tool system according to claim 1, wherein the information processing apparatus is a controller configured to control the machine tool main body for machining the workpiece, or another controller different from the controller configured to control the machine tool main body.

15. The machine tool system according to claim 1, wherein the information processing apparatus is configured to calculate the shapes of the multiple members in the machining area and the arrangement state thereof, for each of a plurality of machine tool main bodies and determine whether or not there is a predetermined fault for each of the machine tool main bodies.

16. The machine tool system according to claim 1, wherein the geometric feature calculating unit configured to calculate the shapes of the multiple members located in the machining area and the arrangement state thereof, based on image data taken by the image pickup device arranged in the tool magazine before the workpiece is machined.

* * * * *